(No Model.)
A. ANDERSON.
INSULATING COUPLING.
No. 474,569. Patented May 10, 1892.
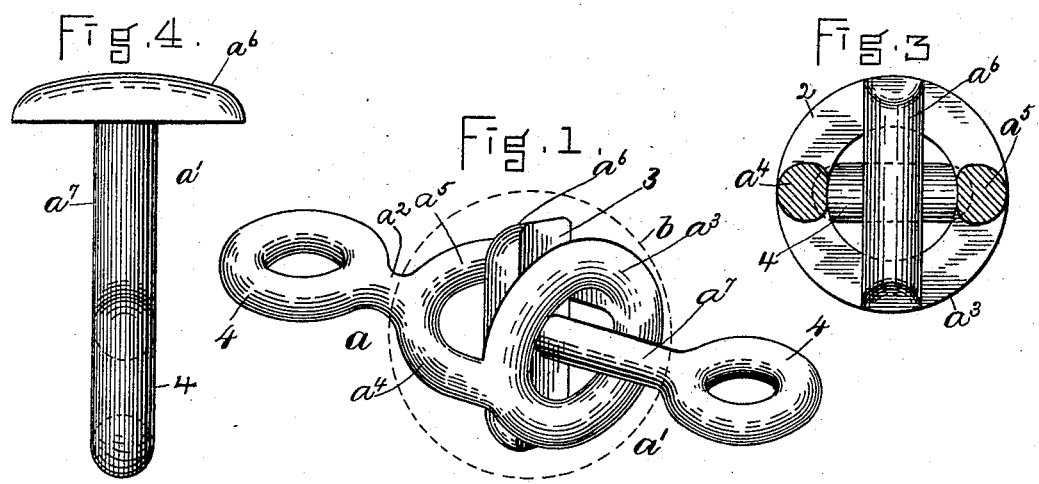
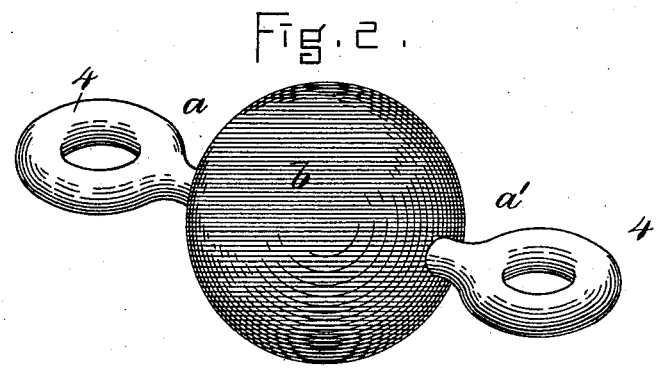
WITNESSES.
Henry Marsh.
S. C. Fearing
INVENTOR.
Albert Anderson
By Jas. H. Churchill
Atty.

UNITED STATES PATENT OFFICE.

ALBERT ANDERSON, OF BOSTON, MASSACHUSETTS, ASSIGNOR OF ONE-HALF TO JOHAN M. ANDERSEN, OF SAME PLACE.

INSULATING-COUPLING.

SPECIFICATION forming part of Letters Patent No. 474,569, dated May 10, 1892.

Application filed March 21, 1892. Serial No. 425,685. (No model.)

*To all whom it may concern:*

Be it known that I, ALBERT ANDERSON, residing in Boston, county of Suffolk, and State of Massachusetts, have invented an Improvement in Insulating-Couplings, of which the following description, in connection with the accompanying drawings, is a specification, like letters and figures on the drawings representing like parts.

This invention relates to an insulating connection or coupling especially adapted to be used on the overhead system of electric railways. In the overhead system of electric railways it is especially desirous to provide equipment which shall be substantially light, but which will possess sufficient strength to withstand an excessive strain or weight.

My present invention has for its object to provide a strong, simple, and efficient insulating connection or coupling capable of withstanding an excessive strain.

In accordance with my invention the insulating connection or coupling is composed of two members or parts electrically separated from each other by insulating material and interlocked or locked together and constructed as will be described, whereby a flat and substantially wide surface is obtained, between which the insulating material is compressed when the insulator is placed under tension.

The particular features of my invention will be pointed out in the claims at the end of this specification.

Figure 1 represents in perspective an insulating-coupling embodying my invention, the insulating material being represented by dotted lines. Fig. 2 is a perspective view of the insulating-coupling shown in Fig. 1, with the interlocked parts or members concealed by the insulating material; Fig. 3, a detail in section and plan to be referred to, and Fig. 4 a detail of one of the members to be referred to.

My improved insulating-coupling is composed of two parts or members $a$ $a'$, preferably made of metal and interlocked together, as will be described. The member $a$ consists of a shank $a^2$, joined to an annular ring $a^3$ by arms $a^4$ $a^5$, substantially diametrically opposite each other and preferably cast integral with the ring $a^3$ and shank $a^2$. The arms $a^4$ $a^5$ form an arch or bow, into which the head $a^6$ of the member $a'$ is extended, the said head being made substantially as long as the diameter of the ring $a^3$ and is extended through the said arch or bow, so that the said head lies substantially at right angles to the arms $a^4$ $a^5$. The member $a'$ consists of the head $a^6$ and a shank $a^7$, extended through the annular ring $a^3$. The inner face 2 of the ring $a^3$ is made substantially flat, as represented in Fig. 3, and the inner or under face 3 of the head $a^6$ is also made substantially flat, so that when embedded in the insulating material $b$ a substantially wide surface is obtained, between which the insulating material is compressed when the members $a$ $a'$ are placed under tension. The head $a^6$ of the member $a'$ is made longer than the opening in the ring $a^3$ and longer than the distance between the crown of the arch and the ring $a^3$, and the said head is thus locked in the member $a$, which may be effected by casting the metal of which the members $a$ $a'$ are composed in a suitable mold. (Not shown.) Each member $a$ $a'$ may have its uncovered end provided with an eye 4, or it may be made of any desired shape to enable the insulator to be connected in position.

The insulating-coupling herein shown is especially adapted to be used in the construction of overhead electric railways—as, for instance, to connect portions of the span-wire—and, owing to the great strength of the members $a$ $a'$, the coupling is enabled to sustain an excessive strain or weight.

The construction herein shown is especially advantageous in case the insulation should become broken by reason of an excessive strain or weight, for by reason of the members being interlocked the coupling is prevented from parting under severe strain. Furthermore, it will be noticed that the insulating material between the head $a^6$ and the ring $a^3$ is under compression between two substantially flat and wide surfaces, thereby obviating any cutting or disintegrating action of the two compressing-surfaces when under severe strain, and thus prolonging the life and usefulness of the coupling.

I claim—

1. In an insulating-coupling, the combination, with the member $a$, consisting of the ring $a^3$, provided with the substantially diametrically-opposite arms $a^4$ $a^5$, of the member $a'$, consisting of the shank extended through the ring and the head $a^6$, located between the arms $a^4$ $a^5$ and of a greater length than the opening in the ring $a^3$, and insulating material enveloping the said members, substantially as described.

2. In an insulating-coupling, the combination, with the member $a$, consisting of the ring $a^3$, provided with the substantially flat face 2 and having the arms $a^4$ $a^5$, integral with the ring and with the shank $a^2$, of the member $a'$, consisting of the shank extended through the ring $a^3$, and the head $a^6$, secured to the shank and made of a greater length than the diameter of the opening in the ring $a^3$ and provided with the substantially flat face or surface 3, and insulating material enveloping the said members and interposed between the same, substantially as described.

In testimony whereof I have signed my name to this specification in the presence of two subscribing witnesses.

ALBERT ANDERSON.

Witnesses:
JAS. H. CHURCHILL,
SADIE C. FEARING.